United States Patent
Johansson et al.

(10) Patent No.: US 10,257,488 B2
(45) Date of Patent: Apr. 9, 2019

(54) VIEW SYNTHESIS USING LOW RESOLUTION DEPTH MAPS

(71) Applicant: Telefonaktiebolaget L M Ericsson (publ), Stockholm (SE)

(72) Inventors: Bjorn Johansson, Bjarred (SE); Thomas Rusert, Kista (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 578 days.

(21) Appl. No.: 14/394,736

(22) PCT Filed: Mar. 22, 2013

(86) PCT No.: PCT/EP2013/056075
§ 371 (c)(1),
(2) Date: Oct. 15, 2014

(87) PCT Pub. No.: WO2013/156250
PCT Pub. Date: Oct. 24, 2013

(65) Prior Publication Data
US 2015/0130898 A1    May 14, 2015

Related U.S. Application Data

(60) Provisional application No. 61/635,484, filed on Apr. 19, 2012.

(51) Int. Cl.
*H04N 7/18* (2006.01)
*H04N 13/111* (2018.01)
(Continued)

(52) U.S. Cl.
CPC .......... *H04N 13/111* (2018.05); *G06T 15/205* (2013.01); *H04N 13/161* (2018.05); *H04N 19/597* (2014.11)

(58) Field of Classification Search
CPC ................................................... H04N 13/111
(Continued)

(56) References Cited

U.S. PATENT DOCUMENTS 5,892,516 A * 4/1999 Alexander .............. G06T 15/04
345/582
2005/0285874 A1* 12/2005 Zitnick, III ........... G06T 15/205
345/592

(Continued)

FOREIGN PATENT DOCUMENTS

| CN | 102203829 A | 9/2011 |
| CN | 102365869 A | 2/2012 |
| EP | 2 230 856 A2 | 9/2010 |

OTHER PUBLICATIONS

PCT International Search Report, dated Jun. 25, 2013, in connection with International Application No. PCT/EP2013/056075, all pages.

(Continued)

*Primary Examiner* — Leron Beck
(74) *Attorney, Agent, or Firm* — Leffler Intellectual Property Law, PLLC (57) ABSTRACT

View synthesis is performed based on obtained texture data and a depth map. The resolution of the depth map is lower than that of the texture data by a ratio dw in the x direction and by a ratio dh in the y direction. Texture pixel positions x, y are transformed into non-integer depth map pixel positions by performing divisions x/dw and y/dh and these non-integer depth map pixel positions are rounded to integer depth map pixel positions, and a view is synthesized based at least on the obtained texture data and depth map values at the integer depth map pixel positions and/or adjacent positions.

11 Claims, 10 Drawing Sheets

(51) Int. Cl.
*H04N 13/161* (2018.01)
*G06T 15/20* (2011.01)
*H04N 19/597* (2014.01)

(58) Field of Classification Search
USPC .......................................................... 348/43
See application file for complete search history.

(56) References Cited

U.S. PATENT DOCUMENTS

| | | | |
|---|---|---|---|
| 2010/0141651 | A1 | 6/2010 | Tan |
| 2011/0285813 | A1 | 11/2011 | Girdzijauskas et al. |
| 2012/0229602 | A1* | 9/2012 | Chen ................ H04N 19/597 348/43 |
| 2012/0269458 | A1* | 10/2012 | Graziosi ............ H04N 19/597 382/299 |
| 2013/0002816 | A1* | 1/2013 | Hannuksela ............. G06T 9/00 348/43 |
| 2013/0148722 | A1* | 6/2013 | Zhang ................ H04N 19/597 375/240.12 |
| 2013/0176390 | A1* | 7/2013 | Chen ................ H04N 19/597 348/43 |
| 2013/0194255 | A1* | 8/2013 | Lee .................... H04N 19/597 345/419 |
| 2013/0271565 | A1* | 10/2013 | Chen ................ H04N 13/0048 348/43 |
| 2014/0071235 | A1* | 3/2014 | Zhang ................ H04N 19/597 348/43 |

OTHER PUBLICATIONS

PCT Written Opinion, dated Jun. 25, 2013, in connection with International Application No. PCT/EP2013/056075, all pages.
International Preliminary Report on Patentability, dated Jul. 29, 2014, in connection with International Application No. PCT/EP2013/056075, all pages.
Yanjie Li et al. "A Novel Upsampling Scheme for Depth Map Compression in 3DTV System" 2010 Picture Coding Symposium, Nagoya, Dec. 8-12, 2010, XP030081960, pp. 186-189.
Wildeboer, O. M. et al. "Color Based Depth Up-Sampling for Depth Compression" 2010 Picture Coding Symposium, Nagoya, Dec. 8-12, 2010, XP030081956, pp. 170-173.
Ekmekcioglu, Erhan et al. "Multi-view Video Coding via Virtual View Generation (Abstract)" 2007 Picture Coding Symposium, Lisbon, Nov. 7-9, 2007, XP030080448, pp. 1-4.
Tam W. J. et al. "Depth map preprocessing and minimal content for 3D-TV using depth-based rendering" JVT Meeting of Joint Video Team of ISO/IEC (JTC1/SC29/WG11 and ITU-T SG.16), San Jose, CA, USA, Apr. 21-27, 2007, XP030007055, ISSN: 0000-0153, pp. 1-5.
Li Zhang et al. "3D-CE1.A related: View synthesis based on asymmetric texture and depth resolutions" MPEG Meeting (Motion Picture Expert Group or ISO/IEC JTC1/SC29/WG11), No. m24941, Geneva, Apr. 30, 2012-May 4, 2012, XP030053284, pp. 1-4.
Kwan-Jung Oh et al. "Depth Reconstruction Filter and Down/Up Sampling for Depth Coding in 3-D Video" IEEE Signal Processing Letters, IEEE, Piscataway, NJ, US, vol. 16, No. 9, Sep. 1, 2009, XP011262051, ISSN: 1070-9908, pp. 747-749.
Girdzijauskas, Ivana et al. "3D-AVC-CE6 results on edge-adaptive median filtering" MPEG Meeting (Motion Picture Expert Group or ISO/IEC JTC1/SC29/WG11), No. m23766, San Jose, CA, USA, Feb. 6-10, 2012, XP030052291, pp. 1-8.
Smirnov, Sergey "Methods for depth-map filtering in veiw-plusdepth 3D video representation" Jan. 25, 2012, XP055037421, retrieved from the Internet: URL:http://asp.eurasipjournals.com/content/pdf/1687-6180-2012-25.pdf, pp. 1-21.
Schwarz, Heiko et al. Test Model under Consideration for HEVC based 3D video coding: MPEG Meeting (Motion Picture Expert Group or ISO/IEC JTC1/SC29/WG11), No. N12559, San Jose,CA, USA, Feb. 6-10, 2012, XP030019033, pp. 1-46.
Chinese Office Action, dated Feb. 3, 2017, in connection with Chinese Application No. 201380020291.4, 5 pages.
English translation of Chinese Office Action, dated Feb. 3, 2017, in connection with Chinese Application No. 201380020291.4, 9 pages.
English translation of Chinese Search Report, dated Feb. 3, 2017, in connection with Chinese Application No. 201380020291.4, 3 pages.

\* cited by examiner

VIEW SYNTHESIS USING LOW RESOLUTION DEPTH MAPS

CROSS-REFERENCE TO RELATED APPLICATIONS

This application claims the benefit of U.S. Provisional Application No. 61/635,484, filed Apr. 19, 2012, which is hereby incorporated herein by reference in its entirety.

TECHNICAL FIELD

This disclosure concerns coding of 3D video, which in addition to one or multiple video views contains one or multiple associated depth maps.

BACKGROUND

View synthesis, VS, describes the process of synthesizing a video view at a virtual camera position, using a video view/texture data and an associated depth map at a reference camera position. VS can be used as a part of a 3D video compression scheme and is then denoted as view synthesis prediction, VSP. In some 3D video compression schemes, such as considered in the work of the moving picture experts group, MPEG, depth maps are coded at reduced resolution, i.e. lower resolution than the associated video data. Work is currently going on within the joint collaborative team on 3D video coding extension development of ITU-T SG 16 WP 3 and ISO/IEC JTC 1/SC 29/WG 11.

However conventional VS and thus VSP algorithms require depth information at the same resolution as the video data. The problem is how to perform VSP using low resolution depth map data. VSP may be part of 3D video encoders and decoders but may also be performed externally. For instance, it may be applied for image rendering after 3D video decoding. The operation could be performed in a device such as a mobile phone, a tablet, a laptop, a PC, a set-top-box, or a television set.

In some more detail, coding and compression of 3D video, involve reducing the amount of data in image sequences of e.g. stereoscopic (two cameras) or multiview (several cameras) image sequences, which in addition to one or multiple video views containing texture data contain one or multiple associated depth maps. That is, for one or several of the video views, an associated depth map is available, describing the depth of the scene from the same camera position as the associated video view. With the help of the depth maps, the contained video views can be used to generate additional video views e.g. for positions in between or outside the positions for the contained video views. A process of generating additional views by view synthesis is illustrated in FIG. 1.

Figure 1:
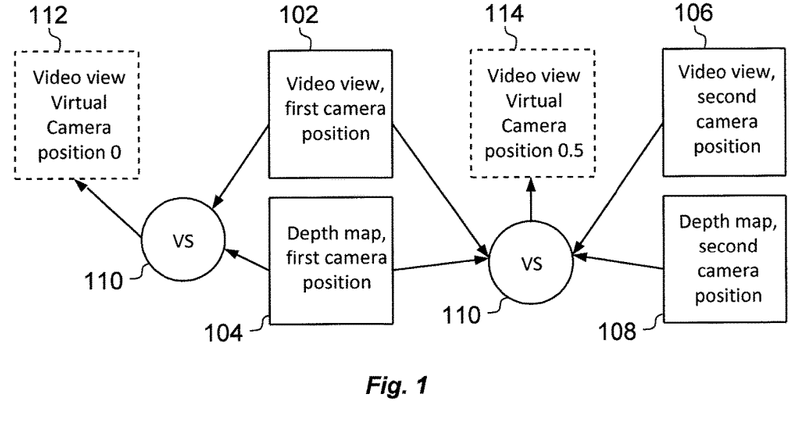
FIG. 1 is a diagram that schematically illustrates view synthesis.

FIG. 1 depicts an example with two original camera positions, a first camera position and a second camera position. For these positions, both video views 102, 106 and associated depth maps 104, 108 exist. Using a single video view and a depth map, additional views at virtual camera positions can be generated using view synthesis as illustrated in FIG. 1 by a video view 112 at a virtual camera position 0. Alternatively, two or more pairs of video views and depth maps can be used to generate an additional view 114 at a virtual camera position between the first and the second camera positions as illustrated in FIG. 1 by virtual camera position 0.5.

Typically, in the view synthesis process, for each pixel in a video view, an associated depth map pixel exists. The depth map pixel can be transformed into a disparity value using known techniques. The disparity value can be seen as a value that maps pixels between original and synthesized positions, e.g. how many pixels an image point in the original image "moves" in horizontal direction when the synthesized image is created. The disparity value can be used to determine a target position of the associated video pixel with respect to the virtual camera position. Thus, the synthesized view may be formed by reusing the associated video pixels at the respective target positions.

Traditional 'mono' (one camera) video sequences can be effectively compressed by predicting the pixel values for an image using previous images and only code the differences after prediction (inter-frame video coding). For the case of 3D video with multiple views and both video and depth maps, additional prediction references can be generated by means of view synthesis. For instance, when two video views with associated depth maps are compressed, the video view and associated depth map for the first camera position can be used to generate an additional prediction reference to be utilized for coding of the second video view. This process is the View Synthesis Prediction, which is illustrated in FIG. 2.

Figure 2:
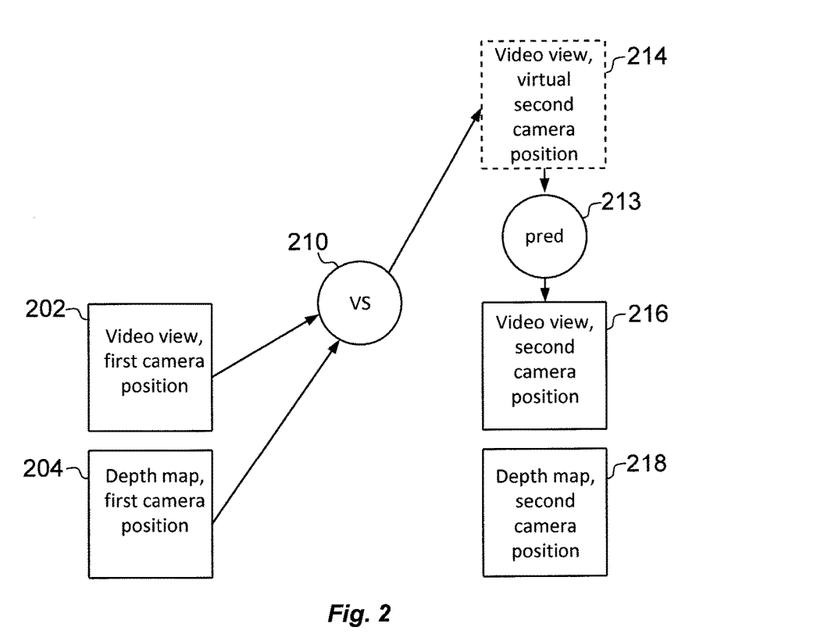
FIG. 2 is a diagram that schematically illustrates view synthesis prediction.

In FIG. 2, the video view 202 and associated depth map 204 at a first camera position is used to synthesize a reference picture in the form of a virtual view 214 at a virtual second camera position. The synthesized reference picture in the form of the virtual view 214 is then used as a prediction reference for coding of the video view 216 and a depth map 218 at the second camera position. Note that this prediction is conceptually similar to "inter-frame" prediction in conventional (mono) video coding. As in conventional video coding, the prediction is a normative (standardized) process that is performed both on the encoder and the decoder side.

In the "3DV" activity in MPEG standardization, VSP is considered as a potential coding tool. Moreover, the coding of depth maps at reduced resolution is considered. That is, the depth maps have a lower resolution than the associated video views. This is to reduce the amount of data to be coded and transmitted and to reduce the complexity in the decoding, i.e. reduce decoding time. On the other hand, view synthesis algorithms typically rely on the fact that video view and depth map have the same resolution. Thus, in the current test model/reference software in MPEG (H.264/AVC-based MPEG 3D video encoding/decoding algorithm, under development), the depth map is upsampled to the full (video view) resolution before it is used in the VSP.

One approach to perform the depth map upsampling is to use "bilinear" filtering. Additionally, several algorithms have been proposed in MPEG to improve the quality of the upsampled depth map, and thus improve the accuracy of VSP operation, aiming at better 3D video coding efficiency.

In the current test model in MPEG, the depth maps are coded at reduced resolution. The depth maps themselves are coded by means of inter-frame prediction. That is, low resolution depth maps need to be stored as reference frames for future prediction. Additionally, the depth maps are upsampled to full (video view) resolution, so as to be used for VSP. That means, for a given moment in time, both the low resolution depth map and the upsampled depth map need to be stored (in the encoder and decoder). For example, assuming 8-bit depth representation, a video resolution of W*H and depth map resolution of W*H/4, the amount of data to be stored for the low resolution depth map is W*H/4 bytes (around 500 kbytes for full HD resolution) and the additional amount of data to be stored for the full resolution depth map (to be used for VSP) is W*H bytes (around 2 Mbytes for full HD).

One drawback of such a scheme is the additional storage requirement for the upsampled depth map. A second drawback is the computational requirements associated with the depth map upsampling.

These two drawbacks have influence on the compression efficiency of the 3D video coding system that utilizes such a scheme. That is, the 3D video coding is affected by the quality of the VS process used in the VSP, and thus is affected by the depth maps used for the VS.

SUMMARY

It is an object to obviate at least some of the above disadvantages and therefore there is provided, according to a first aspect, a method of performing view synthesis. The method comprises:

obtaining texture data comprising pixels arranged along an x direction and arranged along a y direction, obtaining a depth map, the depth map being associated with the obtained texture data and where the resolution of the depth map is lower than that of the texture data by a ratio dw in the x direction and by a ratio dh in the y direction, transforming texture pixel positions x, y into non-integer depth map pixel positions by performing divisions x/dw and y/dh, rounding the non-integer depth map pixel positions to integer depth map pixel positions, and synthesizing a view based at least on the obtained texture data and depth map values at the integer depth map pixel positions.

In some embodiments, the step of synthesizing is instead based at least on the obtained texture data and depth map values adjacent to the integer depth map pixel positions. Variations of such embodiments are performed using also depth map values at the integer depth map pixel positions. These embodiments include those wherein the synthesizing of the view is performed using depth map values that are functions of the depth map values at the integer depth map pixel positions, depth map values at positions adjacent to the integer depth map pixel positions and rounding errors obtained in the rounding of the non-integer depth map pixel positions to integer depth map pixel positions.

In other words, to summarize, these aspects avoid the depth map upsampling that is required in the prior art, and thus avoiding the problems with additional memory and computational complexity requirements.

That is, as no high resolution depth map is required (to be stored/transmitted), the embodiments described herein have the advantage of reduced memory consumption. The embodiments also involve reduced computational complexity and good coding efficiency.

According to a second aspect, there is provided a device comprising digital processing means, memory means and communication means that are configured to handle texture data and depth map data as summarized above.

According to a third aspect, there is provided a non-transitory computer program product comprising software instructions that, when executed in a processor, performs the method as summarized above.

Further aspects provide a video encoder and a video decoder that can be realized in a hardware device as well as in software.

The effects and advantages of these further aspects correspond to the effects and advantages as summarized above in connection with the first aspect.

DETAILED DESCRIPTION

As indicated above, in the VS, when mapping a video pixel at pixel position (x,y) (assuming x,y are integer index positions) to a virtual camera position, a depth map value at position (x,y) is required. If the depth map is available only at a lower resolution (e.g. resolution reduced by a factor of dw horizontally and dh vertically, e.g. dw=dh=2), the corresponding depth map pixel position can be determined as (x/dw, y/dh). If both x/dw and y/dh are integer positions, a corresponding depth map pixel exists. If either x/dw or y/dh are non-integer, an "intermediate" depth map value is required, but not available. Solution 1 is to use an index rounding, i.e. to use the depth map value at position (round (x/dw), round(y/dh)) in the VSP.

Here, the operation "round( . . . )" can represent rounding to the closest integer position, or rounding to the closest smaller integer position (which is a preferred solution since it is particularly simple to implement by truncating the fractional part of the number to be rounded, or so-called "integer division") or rounding to the closest larger integer position.

Figure 3A:
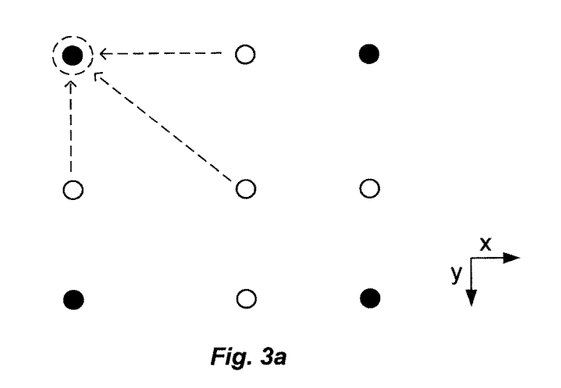
FIG. 3a schematically illustrates a rounding process.
Figure 3B:
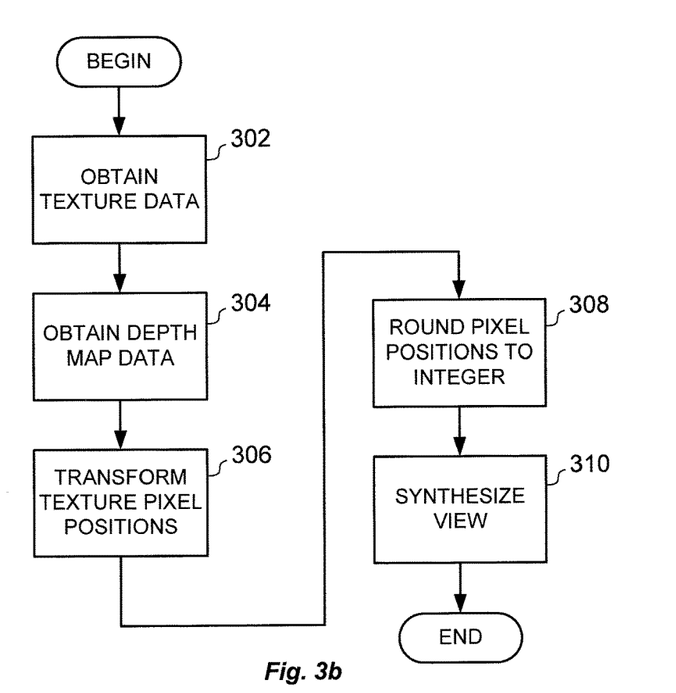
FIG. 3b is a flow chart of a method.

The rounding process can be illustrated as in FIGS. 3a and 3b.

In FIG. 3a, the dark dots represent integer index positions in the depth map, and the light dots represent non-integer index positions. That is, for the dark points, both x/dw and y/dh are integer values, and for the light points either or both of x/dw and y/dh are non-integer. For the dark points, the depth values are available and can be used for the VSP. For the light points, the index positions are rounded to the closest smaller integer position, as indicated by the dashed arrows for three of the light points. The rounding is done in a similar way for the remaining light points.

Simulations have shown that using this process yields only slightly worse compression efficiency than the depth map upsampling based on bilinear interpolation used in the MPEG test model (around 0.06% bit rate increase), while being much less demanding in terms of computational complexity and memory requirements.

A flow chart of an exemplifying method that embodies such a process is illustrated in FIG. 3b. The method commences with two obtaining steps 302, 304 where, in obtaining step 302 texture data is obtained that comprises pixels arranged along an x direction and arranged along a y direction. Typically, as the skilled person will realize, the x and y directions define a rectangular coordinate system and the texture data can include video frames.

In the obtaining step 304, depth map data in the form of a depth map is obtained. The depth map is associated with the obtained texture data and the resolution (i.e. spatial resolution) of the depth map is lower than that of the texture data by a ratio dw in the x direction and by a ratio dh in the y direction.

It is to be noted that, even if the flow chart in FIG. 3b may give the impression that the obtaining steps 302, 304 are performed sequentially, these steps 302, 304 can be performed in any order and also performed concurrently, i.e. in parallel.

A transformation step 306 is then performed where texture pixel positions x, y are transformed into non-integer depth map pixel positions by performing divisions x/dw and y/dh.

A rounding step 308 is then performed where the non-integer depth map pixel positions are rounded to integer depth map pixel positions. For example, the rounding of the non-integer depth map pixel positions to integer depth map pixel positions can be performed towards the closest integer depth map pixel position smaller than the non-integer depth map pixel position.

A synthesizing step 310 is then performed where a view is synthesized based at least on the obtained texture data and depth map values at the integer depth map pixel positions.

As a variation to the process exemplified in FIGS. 3a and 3b, after obtaining the index position in the low resolution depth map (i.e. (round(x/dw), round(y/dh)), i.e. the associated dark point in FIG. 3a), a neighborhood of depth map pixels can be considered to obtain the depth value to be used in the VSP. These variations include calculations as follows and will be exemplified with reference to FIGS. 4a-4e.

Let the low resolution depth map be denoted as $D(u,v)$. Let $(a,b)=(round(x/dw), round(y/dh))$. Let the resulting depth value used for VSP be $V(a,b)$. $V(a,b)$ can be calculated e.g. as the examples 1-9 in table 1.

TABLE 1

| 1 | $V(a, b) = D(a, b)$ |
|---|---|
| 2 | $V(a, b) = max( D(a, b), D(a + 1, b), D(a, b + 1), D(a + 1, b + 1))$ |
| 3 | $V(a, b) = mean( D(a, b), D(a + 1, b), D(a, b + 1), D(a + 1, b + 1))$ |
| 4 | $V(a, b) = max( D(a, b), D(a + 1, b + 1))$ |
| 5 | $V(a, b) = mean( D(a, b), D(a + 1, b + 1))$ |
| 6 | $V(a, b) = max( D(a - 1, b - 1), D(a + 1, b + 1))$ |
| 7 | $V(a, b) = sum\_\{da, db\}(D(a + da, b + db) * w(da, db))$ |
| 8 | $V(a, b) = max( D(a - 1, b - 1), D(a - 1, b + 1), D(a + 1, b - 1), D(a + 1, b + 1))$ |
| 9 | $V(a, b) = max( D(a, b - 1), D(a, b + 1), D(a - 1, b), D(a + 1, b))$ |

Here, "max( . . . )" represents the maximum operation and "mean( . . . )" represents the mean operation over the respective arguments, and "sum_{da,db}(D(a+da,b+db) *w(da,db))" represents a weighted sum D(a,b) over a certain range of values in the neighborhood of (a,b).

Note that example 1 in table 1 is identical to the procedure illustrated in FIGS. 3a and 3b.

Note that the examples that use the "max( . . . )" operator are equivalent to using a so-called "dilation" operation. The other operations involve a smoothing operation. These operations can result in quality gains in VSP (more efficient coding/compression). For example, simulations have shown a 0.20% bitrate decrease for method 4 in table 1 and 0.25% bitrate decrease for method 3 in table 1, illustrating that these methods gives better bitrate, lower complexity and less memory requirement than the MPEG test model.

Figure 4A:
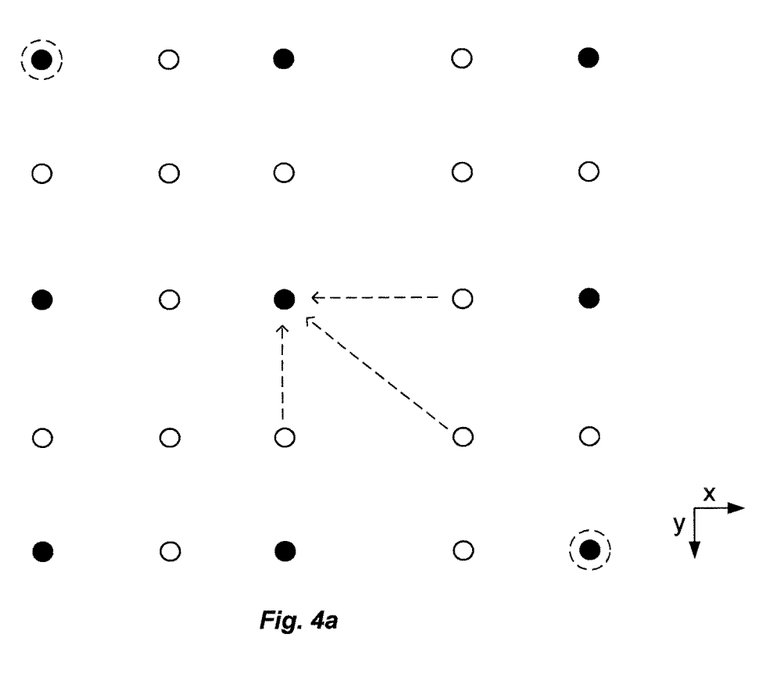
FIGS. 4a-d are schematically illustrated rounding processes.

Example 6 in table 1 is illustrated in FIG. 4a, where the dark points are assumed to be integer index positions, and the central dark point in the figure is assumed to be (a,b). Note that the encircled points are involved in the calculations.

Figure 4B:
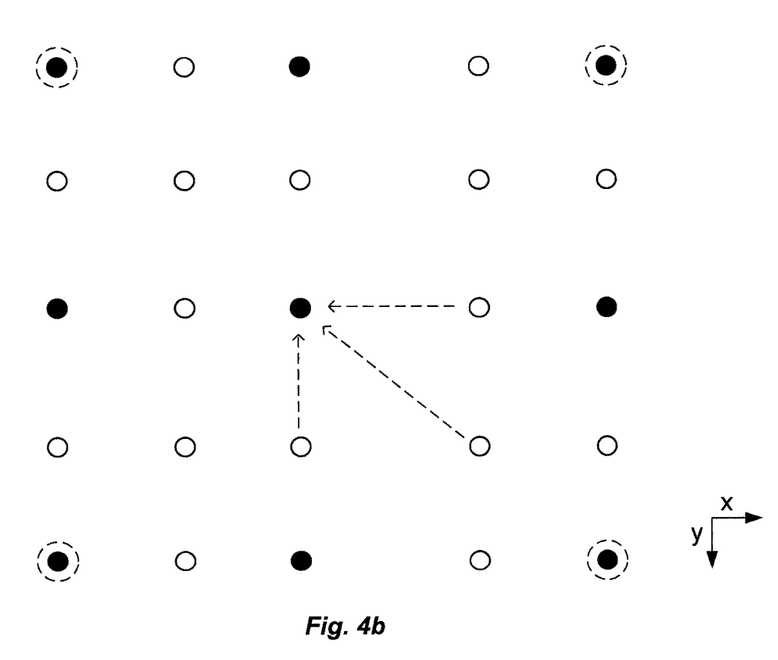
Figure 4C:
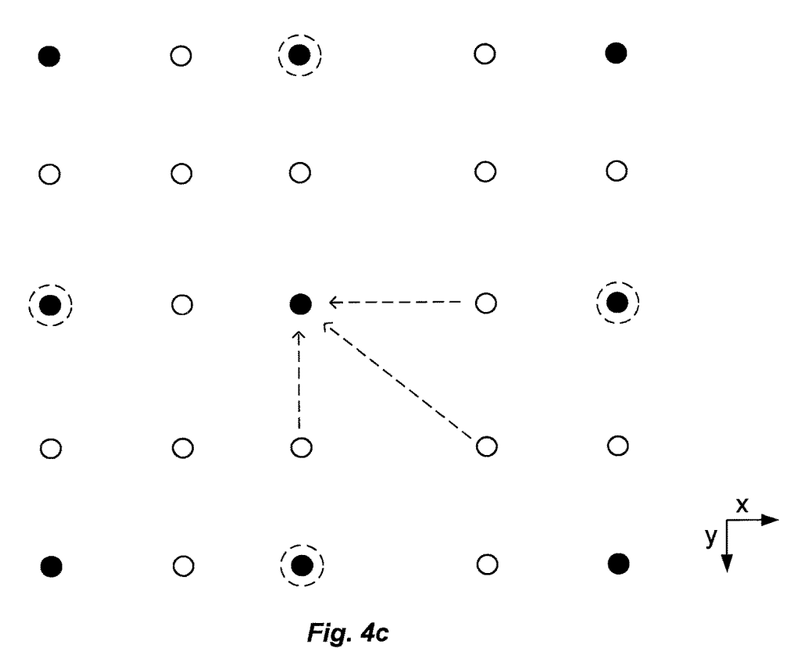
Figure 4D:
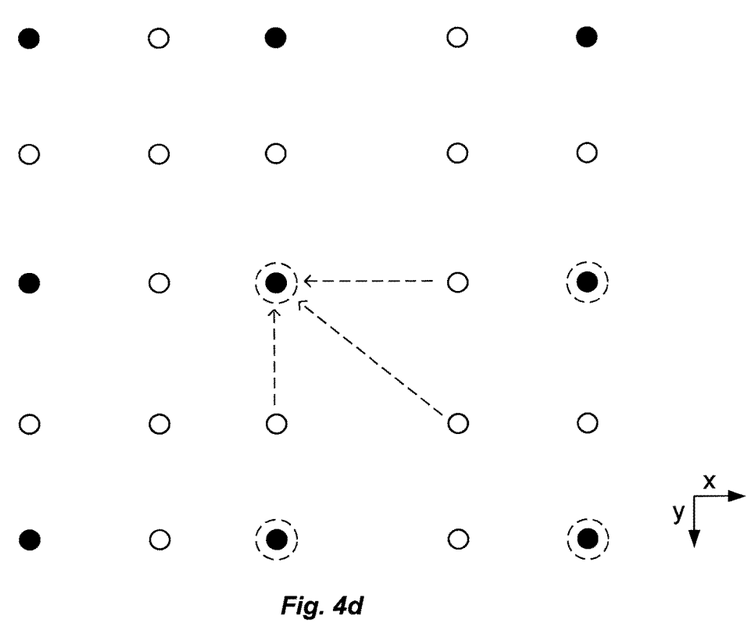

Similarly, the three FIGS. 4b, 4c and 4d illustrate examples 8, 9 and 2 in table 1, respectively, with the encircled points being involved in the calculations.

As a variation on FIGS. 4a-4c (illustrating Examples 6, 8 and 9 in table 1, respectively) the dark centre pixel (a, b) may also be included in the filtering operations as illustrated in table 2.

TABLE 2

| 6a | $V(a, b) = max( D(a - 1, b - 1), D(a, b), D(a + 1, b + 1))$ |
|---|---|
| 8a | $V(a, b) = max( D(a - 1, b - 1), D(a - 1, b + 1), D(a, b), D(a + 1, b - 1), D(a + 1, b + 1))$ |
| 9a | $V(a, b) = max( D(a, b - 1), D(a, b + 1), D(a, b), D(a - 1, b), D(a + 1, b))$ |

Figure 4E:
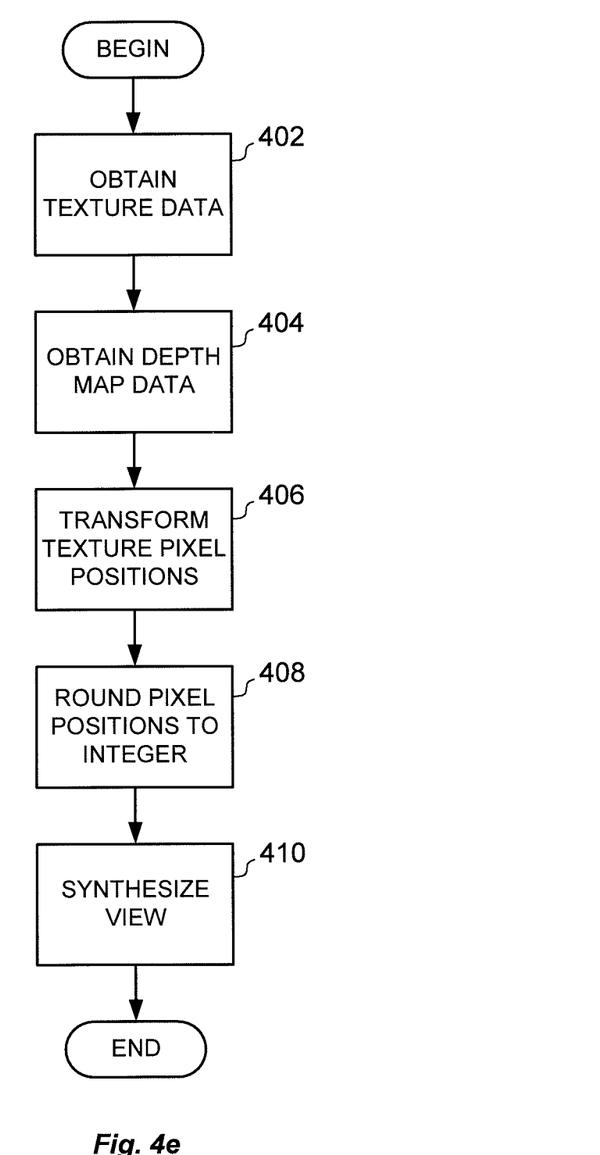
FIG. 4e is a flow chart of a method.

A flow chart of an exemplifying method that embodies such a process is illustrated in FIG. 4e. The method commences with two obtaining steps 402, 404 where, in obtaining step 402 texture data is obtained that comprises pixels arranged along an x direction and arranged along a y direction. Typically, as the skilled person will realize, the x and y directions define a rectangular coordinate system and the texture data can include video frames.

In the obtaining step 404, depth map data in the form of a depth map is obtained. The depth map is associated with the obtained texture data and the resolution (i.e. spatial resolution) of the depth map is lower than that of the texture data by a ratio dw in the x direction and by a ratio dh in the y direction.

It is to be noted that, even if the flow chart in FIG. 4e may give the impression that the obtaining steps 402, 404 are performed sequentially, these steps 402, 404 can be performed in any order and also performed concurrently, i.e. in parallel.

A transformation step 406 is then performed where texture pixel positions x, y are transformed into non-integer depth map pixel positions by performing divisions x/dw and y/dh.

A rounding step 408 is then performed where the non-integer depth map pixel positions are rounded to integer depth map pixel positions. For example, the rounding of the non-integer depth map pixel positions to integer depth map pixel positions can be performed towards the closest integer depth map pixel position smaller than the non-integer depth map pixel position.

A synthesizing step 410 is then performed where a view is synthesized based at least on the obtained texture data and depth map values adjacent to the integer depth map pixel positions. The synthesizing of the view can be performed using also depth map values at the integer depth map pixel positions, as exemplified in table 2 above.

The different examples in table 1 and table 2, with associated processes illustrated in the flow charts of FIGS. 3b and 4e, represent different trade-offs in terms of computational complexity and compression efficiency. In simulations, it has been found that dilation operations may be beneficial for compression efficiency but they may contribute to higher computational complexity. In other words, the depth values at the integer depth map pixel position and/or adjacent positions can be combined by means of a filtering operation such as a dilation operation.

Other embodiments of solutions to obtain depth values for the VSP from low resolution depth maps are those that comprise "on-the-fly" calculation of interpolated depth map values, using position-dependent functions. Thus, dilation operations may be performed to achieve more efficient coding/compression. Preferably a max operation is used.

For example, let (a,b)=(round(x/dw), round(y/dh)) be the integer index position in the low resolution depth map, and (dx,dy)=(x−a*dw, y−b*dh) the sub-integer component (=rounding error). Here, it is assumed that dw and dh are integers. In this case also dx is an integer taking values between −dw+1 and dw−1 depending on the rounding function used. The corresponding holds for dy. As before, D(a, b) is the value of the depth map at position (a, b). Then dependent on the value of (dx,dy), a different method for obtaining a value V(x,y) for VSP may be used. Examples of dilation operations using max operations are given in table 3. Thus, the depth value used in the view synthesis is a function of the depth map value at the integer depth map pixel position, the surrounding depth map values, and the rounding error.

TABLE 3

|   | (dx, dy) | V(x, y) |
|---|---|---|
| 1 | (0, 0) | D(a, b) |
| 2 | (0, 1) | max( D(a, b), D(a, b + 1)) |
| 3 | (1, 0) | max( D(a, b), D(a + 1, b)) |
| 4 | (1, 1) | max( D(a, b), D(a + 1, b + 1)) |
| 5 | (0, −1) | max( D(a, b), D(a, b − 1)) |
| 6 | (−1, 0) | max( D(a, b), D(a − 1, b)) |
| 7 | (−1, −1) | max( D(a, b), D(a − 1, b − 1)) |
| 8 | (1, −1) | max( D(a, b), D(a + 1, b − 1)) |
| 9 | (−1, 1) | max( D(a, b), D(a − 1, b + 1)) |

Figure 5A:
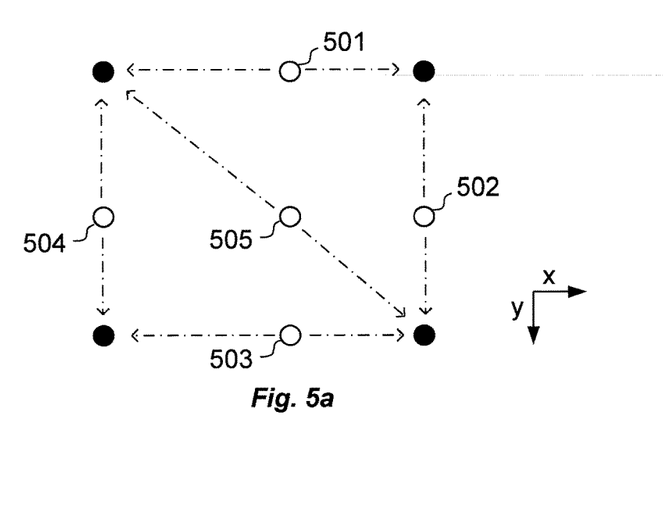
FIG. 5a schematically illustrates a rounding process.

Some of the examples of table 3 are shown in FIG. 5a. The dark dots denote integer position pixels, while the light dots denote subinteger position pixels. In this figure the dot-dashed arrows indicate which of the integer position pixels that are used with the max operation to estimate the depth for the respective intermediate subinteger position pixels. (This is in contrast to the other figures, where the arrows illustrate the rounding). Specifically, examples 3, 2, 3, 2 and 4 in table 3 correspond to subinteger positions 501, 502, 503, 504 and 505, respectively.

Figure 5B:
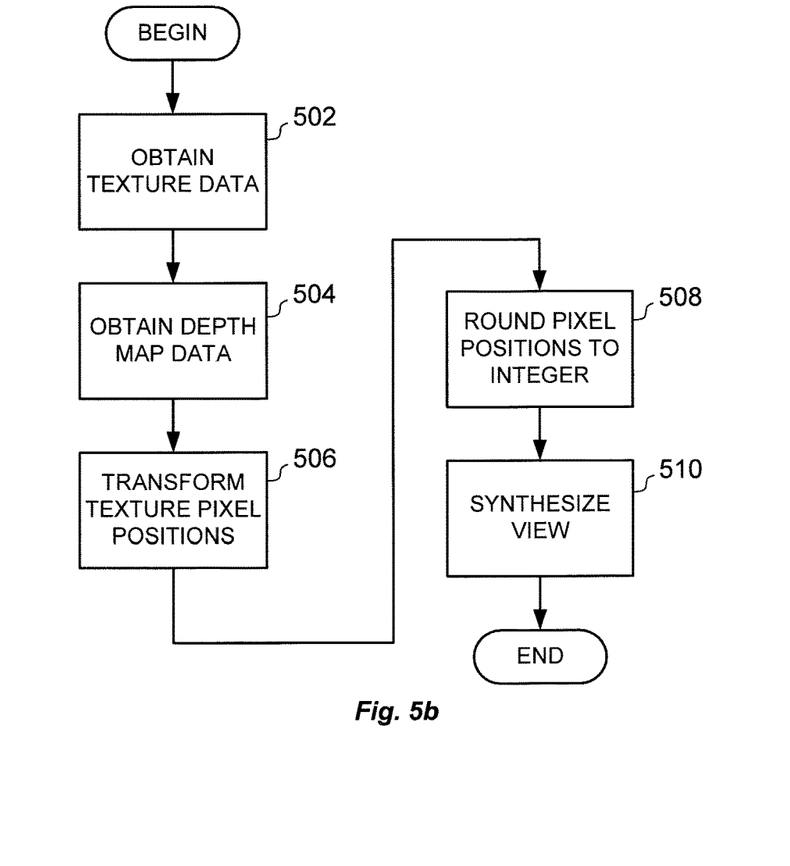
FIG. 5b is a flow chart of a method.

A flow chart of this process is illustrated in FIG. 5b. The method commences with two obtaining steps 502, 504 where, in obtaining step 502 texture data is obtained that comprises pixels arranged along an x direction and arranged along a y direction. Typically, as the skilled person will realize, the x and y directions define a rectangular coordinate system and the texture data can include video frames.

In the obtaining step 504, depth map data in the form of a depth map is obtained. The depth map is associated with the obtained texture data and the resolution (i.e. spatial resolution) of the depth map is lower than that of the texture data by a ratio dw in the x direction and by a ratio dh in the y direction.

It is to be noted that, even if the flow chart in FIG. 5b may give the impression that the obtaining steps 502, 504 are performed sequentially, these steps 502, 504 can be performed in any order and also performed concurrently, i.e. in parallel.

A transformation step 506 is then performed where texture pixel positions x, y are transformed into non-integer depth map pixel positions by performing divisions x/dw and y/dh.

A rounding step 508 is then performed where the non-integer depth map pixel positions are rounded to integer depth map pixel positions. For example, the rounding of the non-integer depth map pixel positions to integer depth map pixel positions can be performed towards the closest integer depth map pixel position smaller than the non-integer depth map pixel position.

As mentioned above, with regard to the rounding function that is used for the rounding in step 508, it is assumed that dw and dh are integers. In this case also dx is an integer taking values between −dw+1 and dw−1 depending on the rounding function used. The corresponding holds for dy.

A synthesizing step 510 is then performed where a view is synthesized based at least on the obtained texture data and depth map values at and adjacent to the integer depth map pixel positions as well as rounding errors obtained in the rounding of the non-integer depth map pixel positions to integer depth map pixel positions.

Similar to the embodiments described above in connection with FIG. 4e, the depth values at the integer depth map pixel position and/or adjacent positions can be combined by means of a filtering operation such as a dilation operation.

The methods according to embodiments of the invention may be incorporated in 3D video encoders and decoders and be implemented in devices such as mobile phones, tablets, laptops, PC:s, set-top-boxes, and television sets. The methods may also be performed outside of 3D video encoders and decoders in such devices. For instance, it may be applied for image rendering after 3D video decoding. The invention is suitably implemented by programming or other configuration of software and hardware. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor may include, without limitation, digital signal processor (DSP) hardware, ASIC hardware, read only memory (ROM), random access memory (RAM), and/or other storage media.

Figure 6A:
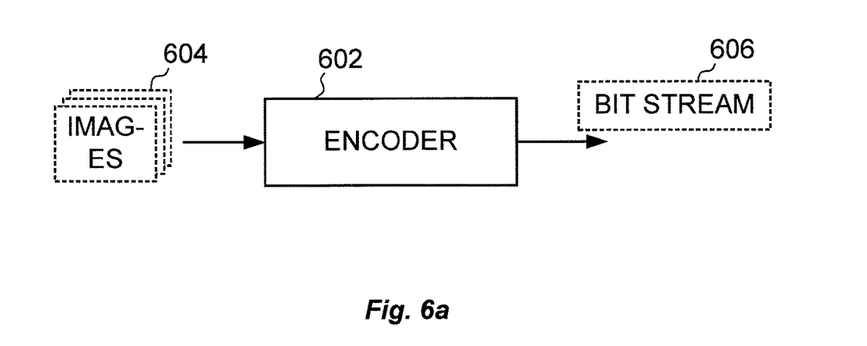
FIGS. 6a and 6b schematically illustrate a 3D video encoder and decoder, respectively.

An example of a video encoder 602 is illustrated in FIG. 6a. The encoder 602 receives input in the form of sequences of images 604 and performs encoding that includes view synthesis prediction processes as described above. The encoder 602 provides output in the form of a bit stream of encoded data 606 that can be stored and/or transmitted to a receiving entity for decoding and rendering. The encoder 602 can be realized in the form of software instructions as well as in the form of a hardware device or a combination thereof.

Figure 6B:
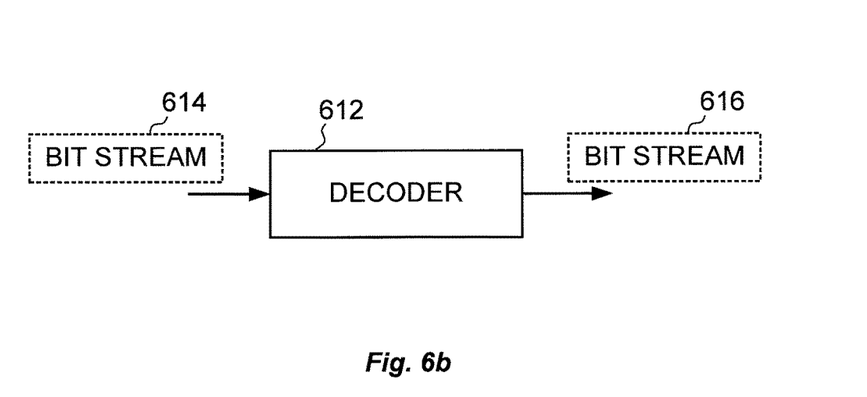

An example of a video decoder 612 is illustrated in FIG. 6b. The decoder 612 receives input in the form of a bit stream 614 and performs decoding that includes view synthesis prediction processes as described above. The decoder 612 provides output in the form of a bit stream 616 that can be provided to a rendering system for providing a viewer with a 3D viewing experience. The decoder 612 can be realized in the form of software instructions as well as in the form of a hardware device or a combination thereof.

Figure 7:
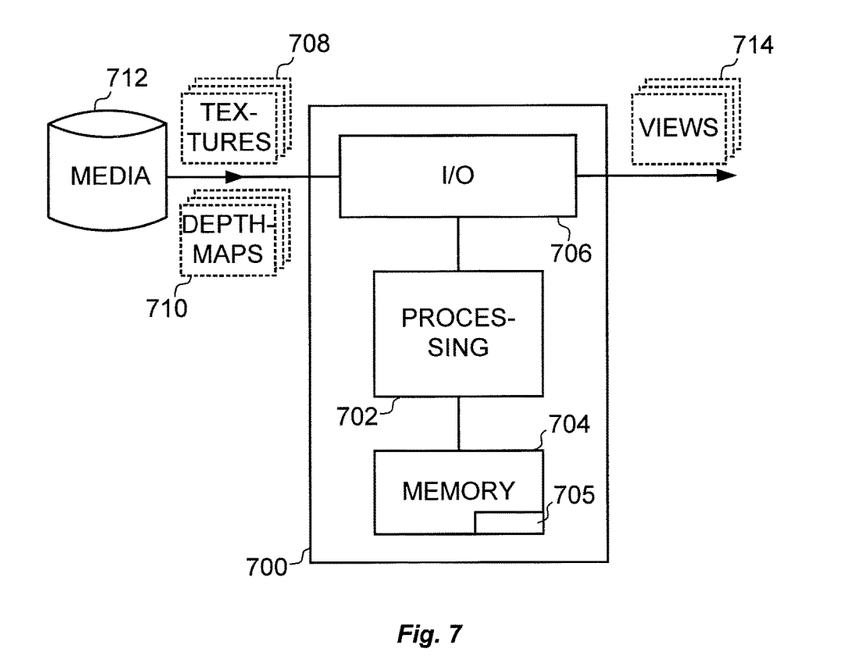
FIG. 7 is a schematically illustrated block diagram of a device.

Another example of a hardware device 700 in which the embodiments of the methods exemplified above is illustrated in FIG. 7. The device 700 comprises a processor 702, memory 704 comprising software instructions 705, and input/output circuitry 706. The device 700 is configured such that it can obtain texture data 708 and depth map data 710 from a media source 712, e.g data originating in a bit stream such as the bit stream 614 in FIG. 6b. Processing takes place under the control of the software instructions 705 that embody any of the methods elucidated above in connection with FIGS. 1-5. The device 700 provides output in the form of views 714 that, e.g., can be rendered by a suitable rendering system.

The invention claimed is:

1. A method of performing view synthesis, comprising:
a view synthesizing apparatus performing:
obtaining texture data comprising pixels arranged along an x direction and arranged along a y direction;
obtaining a depth map, the depth map associated with the obtained texture data and where the resolution of the depth map is lower than that of the texture data, wherein a ratio of depth map data to texture data in a first direction is dw, and a ratio of depth map data to texture data in a second direction is dh, wherein x is a pixel position in the first direction and y is a pixel position in the y direction;
transforming texture pixel positions x, y into non-integer depth map pixel positions by performing divisions x/dw and y/dh;
rounding the non-integer depth map pixel positions to integer depth map pixel positions;
for each of the non-integer depth map pixel positions, using rounding errors obtained in the rounding of the non-integer depth map pixel positions to integer depth map pixel positions as a basis for selecting one of a plurality of dilation operations; and
synthesizing a view based at least on the obtained texture data and lower resolution depth map values adjacent to the integer depth map pixel positions and lower resolution depth map values at the integer depth map pixel positions, wherein the depth values at the integer depth map pixel position and adjacent positions are combined by means of the selected dilation operations.

2. The method of claim 1, wherein the synthesizing of the view is performed using depth map values that are functions of the depth map values at the integer depth map pixel positions and depth map values at positions adjacent to the integer depth map pixel positions.

3. The method of claim 1, wherein the rounding of the non-integer depth map pixel positions to integer depth map pixel positions is performed towards the closest integer depth map pixel position smaller than the non-integer depth map pixel position.

4. A video encoder configured to perform the method of claim 1.

5. A video decoder configured to perform the method of claim 1.

6. A device comprising a digital processor, a memory and input/output circuitry that are configured to handle texture data and depth map data according to claim 1.

7. The device of claim 6, wherein said processor, memory and input/output circuitry form at least part of a video encoder.

8. The device of claim 6, wherein said processor, memory and input/output circuitry form at least part of a video decoder.

9. A non-transitory processor-readable storage medium comprising instructions that, when executed in a processor, perform a method of performing view synthesis, the method comprising:
obtaining texture data comprising pixels arranged along an x direction and arranged along a y direction;
obtaining a depth map, the depth map associated with the obtained texture data and where the resolution of the depth map is lower than that of the texture data, wherein a ratio of depth map data to texture data in a first direction is dw and a ratio of depth map data to texture data in a second direction is dh, wherein x is a pixel position in the first direction and y is a pixel position in the y direction;
transforming texture pixel positions x, y into non-integer depth map pixel positions by performing divisions x/dw and y/dh;
rounding the non-integer depth map pixel positions to integer depth map pixel positions;
for each of the non-integer depth map pixel positions, using rounding errors obtained in the rounding of the non-integer depth map pixel positions to integer depth map pixel positions as a basis for selecting one of a plurality of dilation operations; and
synthesizing a view based at least on the obtained texture data and lower resolution depth map values adjacent to the integer depth map pixel positions and lower resolution depth map values at the integer depth map pixel positions, wherein the depth values at the integer depth map pixel position and adjacent positions are combined by means of the selected dilation operations.

10. The non-transitory computer program product of claim 9, wherein said software instructions forms at least part of a video encoder.

11. The non-transitory computer program product of claim 9, wherein said software instructions forms at least part of a video decoder.

* * * * *